United States Patent
Williams

[19]

[11] Patent Number: 6,056,298
[45] Date of Patent: May 2, 2000

[54] CHUCK LOCK BIT CHANGER

[76] Inventor: Fred G. Williams, 217 Rockwell Ter., Frederick, Md. 21701

[21] Appl. No.: 09/141,756

[22] Filed: Aug. 28, 1998

[51] Int. Cl.[7] .................................................. B23B 31/12
[52] U.S. Cl. .............................. 279/150; 279/60; 279/62; 279/902
[58] Field of Search .................................. 279/60, 61, 66, 279/902, 62–65, 150

[56] References Cited

U.S. PATENT DOCUMENTS

| | | | |
|---|---|---|---|
| 4,669,932 | 6/1987 | Hartley | 279/60 |
| 4,840,387 | 6/1989 | McCarthy | 279/61 |
| 4,930,793 | 6/1990 | Ando | 279/61 |
| 5,431,419 | 7/1995 | Mack | 279/62 |
| 5,775,704 | 7/1998 | Wilson et al. | 279/62 |

*Primary Examiner*—Steven C. Bishop
*Attorney, Agent, or Firm*—John B. Dickman, III

[57] ABSTRACT

A keyless chuck having an outer chuck with spaced grooves, an inner chuck and chuck jaws, where the keyless chuck is mounted on an output shaft of a drill motor. A sleeve locking device mounted between the outer chuck and the drill motor housing, where the sleeve locking device has spaced inner teeth to engage the spaced grooves of the outer chuck to lock the outer chuck stationary, allowing the inner chuck to rotate and opening or closing the chuck jaws to install and remove drill bits.

5 Claims, 2 Drawing Sheets

CHUCK LOCK BIT CHANGER

FIELD OF THE INVENTION

This invention relates generally to drill chucks used for gripping drill bits and mating them to a drill motor, and is more particularly directed to a keyless drill chuck which can be actuated to grasp and release a drill bit through the rotation of a drill motor.

BACKGROUND OF THE INVENTION

Drill motors are commonly used for drilling, screwing, sanding and the like. Typically, drill motors include an electric or fluid motor mounted in a housing having a handle with a built-in trigger switch for actuating the motor when the drill motor operation is desired. The motor has a drive shaft projecting from it and the housing. A chuck assembly is mounted on the drive shaft and includes a locking drum cylinder and an inner cylinder. The inner cylinder threads on the drive shaft and the locking drum cylinder are concentrically mounted to the inner cylinder. A plurality of chuck jaws threadedly engage the locking drum to open or close in response to the locking drum being driven in clockwise or counter-clockwise directions. The chuck jaws grip and release the shafts of drill bit, screw bits, sanding tools and the like.

Prior art chuck jaws are adjusted to receive different size shafts by turning the locking drum with a bevel gear provided on a forward edge of the locking drum. The chuck jaws are manually opened or closed while the drive shaft remains stationary by inserting toothed portions and a pivot pin of a pivot key into the level gear and one of a plurality of equispaced pivot holes on the chuck inner cylinder.

Pivot keys have the disadvantage of often being lost or misplaced, particularly when used with portable tools. Another disadvantage of pivot keys is that not all chuck jaws have the same number of bevelled teeth, therefore, the pivot keys are not interchangeable between chuck assemblies. Some people have found pivot keys difficult to manipulate, due to arthritis, etc.

The advent of keyless chucks has not been totally successful. Some patented keyless chucks, for example, U.S. Pat. No. 4,095,811, issued to Cohen, requires the use of both hands to engage the chuck portion of a drill motor, making it necessary to balance the heavier drill motor during chuck manipulation. U.S. Pat. No. 4,460,296, issued to Silvertson, employs a gripping device for opening and closing jaws of a chuck Where a second portion of the device is urged into frictional or locking engagement. The locking cylinder in U.S. Pat. No. 4,317,578, issued to Welch, is locked to the drill motor housing by a trigger and pin assembly which engages a slot in the locking cylinder. This arrangement also requires two hand manipulation or supporting the drill motor, squeezing the trigger and aligning the drill bit; a somewhat awkward arrangement.

It is accordingly an object of the present invention to provide a new and improved keyless chuck gripping device that uses the rotation energy of a drill motor to bring about the manipulation of the chuck jaws for opening or closing said jaws.

Another object of the invention is to provide a keyless chuck with a switch for changing the motor speed to a predetermined torque for opening or closing the chuck jaws.

Still another object is to provide a keyless chuck locking sleeve device for locking a chuck assembly, in particular an outer chuck.

Yet another object is to provide a keyless chuck locking sleeve device which provides a positive locking engagement with the outer chuck of a chuck assembly.

SUMMARY OF THE INVENTION

A keyless chuck, in accordance with the present invention, comprises a sleeve locking device having interior teeth for engaging and locking with a chuck assembly outer chuck having mating grooves. The chuck assembly includes, in addition to the locking sleeve on the outer chuck, an inner chuck and chuck jaws. By locking the outer chuck stationary with the drill housing, and energizing a drill motor, the inner chuck rotates to open when drill is in reverse, or close the chuck's jaws when the drill is in forward position. The sleeve locking device moves back and forth between a drill motor housing and the chuck assembly. When the sleeve locking device is moved away from the drill motor housing, a switch changes the motor speed to a predetermined torque for opening and closing the chuck jaws. Moving the sleeve locking device forward brings the interior teeth of the sleeve locking device into mating engagement with the exterior grooves of the outer chuck. The exterior grooves of the outer chuck have a wide angle entry to easily align the interior teeth of the sleeve locking device the exterior grooves of the outer chuck.

DESCRIPTION OF THE INVENTION

Figure 1:
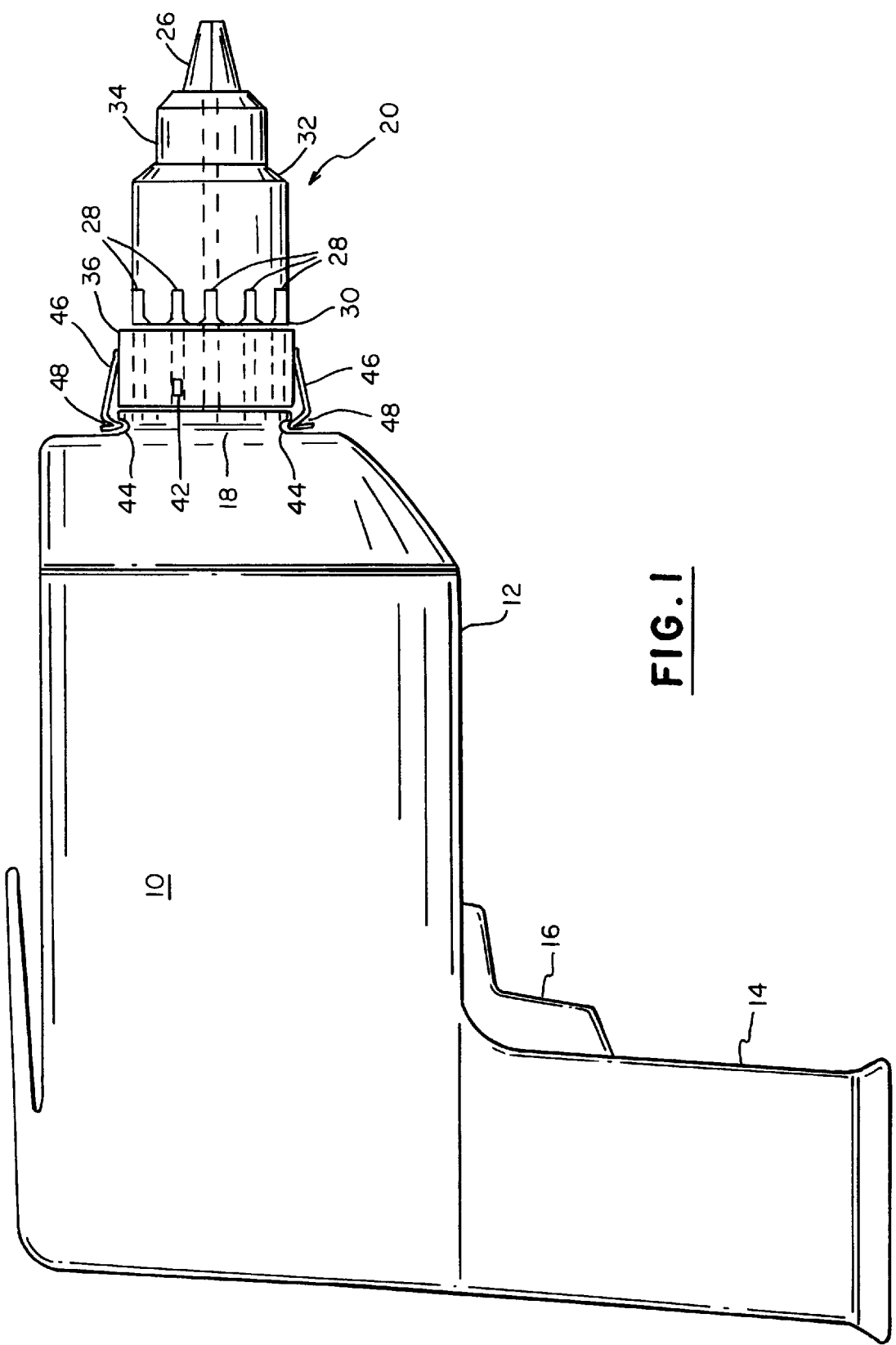
FIG. 1 is a side view of a drill chuck mounted on an electric motor of a drill and a sleeve locking device of the invention.
Figure 2:
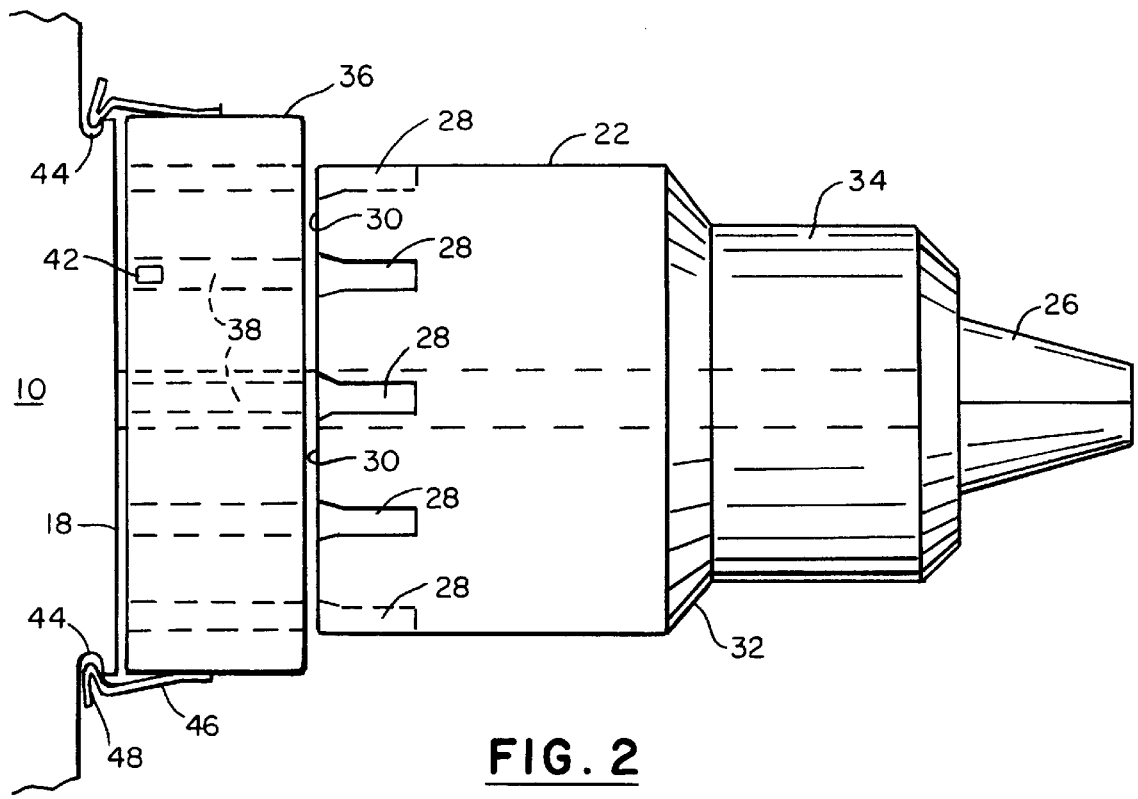
FIG. 2 is a side view showing in detail, a chuck assembly and a sleeve locking device of the invention.
Figure 3:
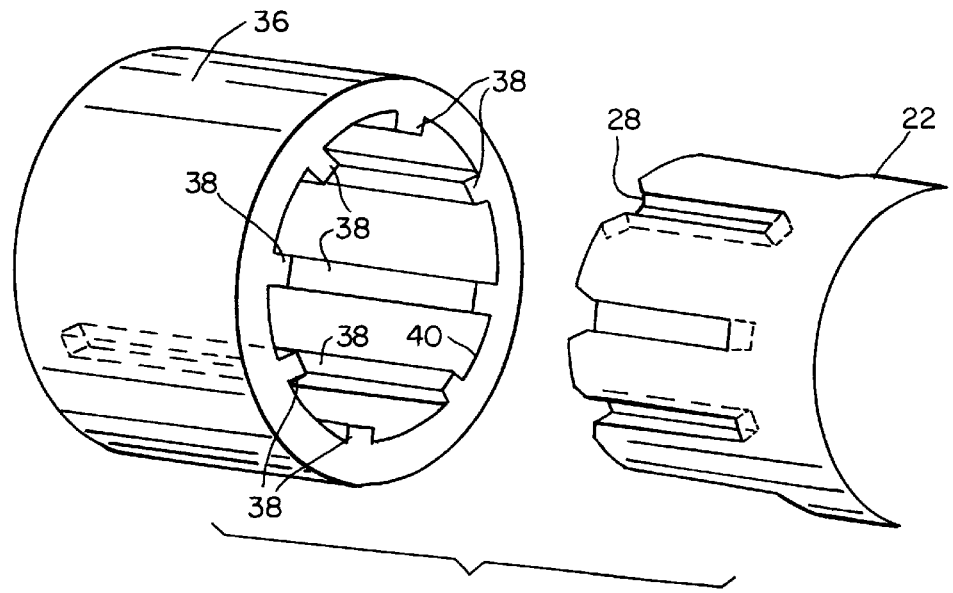
FIG. 3 is an isometric view of a sleeve locking device of the invention.

Referring to the drawings, FIGS. 1–3, there is shown an electric drill motor housing 10 including a housing body 12, a handle 14 and a motor trigger switch 16. The forward end 18 of the housing body 10 has an opening (not shown) from which an output shaft of an electric motor, also not shown, protrudes. The electric motor is of the reversible type having forward and reverse movement. A chuck assembly 20 is threaded on the output shaft and rotates in response to the electric motor.

The chuck assembly 20 has an outer chuck 22, an inner chuck 34 and chuck jaws 26. The outer chuck 22 is conventional in terms of known chucks except for its exterior surface which has grooves 28 equally spaced along its rear surface 30. Outer chuck 22 is cylindrical with a bevelled forward end 32. The outer chuck fits over an inner chuck 34 and rotates independent of the inner chuck 34 which is directly mounted on the output shaft. By holding either the inner chuck 34 or the outer chuck 22 stationary, the chuck jaws 26 can be opened or closed, using known chuck mechanisms.

In order to lock the outer chuck 22 in a stationary position, a sleeve locking device 36 is located between the drill motor housing forward end 18 and the outer chuck 22. The sleeve locking device 36 is cylindrical with interior teeth 38 equally spaced around the inside surface 40, as shown in FIG. 3. Interior teeth 38 of the sleeve locking device 36 align with the exterior grooves 28 of the outer chuck. Sleeve locking device 36 is moved from the drill housing 10 over outer chuck 22 where interior teeth 38 engage grooves 28 of outer chuck 22, locking the outer chuck 22 in a stationary position. One half of the sleeve locking device 36 is on 22 and one half is on the extension of 10.

When sleeve locking device 36 is moved forward, a button switch 42 on the front face of the drill body housing 10 is activated to change the motor speed to a predetermined torque to open and close the chuck jaws 26. Button switch 42 changes the drill's circuitry to a slow speed that clutches out at a predetermined factory set torque. The slow speed of the rotating output shaft turns the inner chuck at a torque to either open of close the chuck jaws 26 while the outer chuck 22 is locked in a stationary position. FIG. 2 shows the drill body housing 10 with a circular groove 44. A plurality or sleeve holding spring clips 46 are held in groove 4 by snap ring detents 48. The sleeve holding spring clips 46 are affixed to sleeve locking device 36 to retain the sleeve locking device 36 on the drill body housing 10, thereby depressing button switch 42 and thus deactivating it.

While only one embodiment of the invention has been shown, it is understood that other embodiments may be realized by those skilled in the art, therefore, one should study the drawings, description and claims for a clear understanding of the invention.

What is claimed is:

1. A device for enabling a chuck assembly of a reversible power tool driven by a rotary drive shaft to be opened and closed so that implements adapted to be held by the chuck assembly can be secured to and removed from the chuck assembly by locking an outer chuck in a stationary position while manipulating an inner chuck, the drive shaft extending through a wall of a housing of the power tool, the housing including a motor for the drive shaft where the motor is connected to the inner chuck; the improvement comprising a chuck locking device, a sleeve locking device for locking said outer chuck stationary; said sleeve locking device having a cylindrical body with inner and outer surfaces said inner surface having a plurality of teeth equally spaced on said inner surface; said chuck assembly outer chuck having a cylindrical body and inner and outer surfaces, where said outer surface has a plurality of equally spaced grooves, where said grooves align with said teeth of said sleeve locking device, and where said sleeve locking device is moved over said outer chuck to mate said sleeve locking device inner teeth with said grooves of said outer chuck.

2. A device as in claim 1 wherein said reversible power tool has a switch means in contact with said sleeve locking device to hold said switch means open, and where when said sleeve locking device is moved away from said reversible power tool said switch means is closed to change the energy of the motor to a predetermined speed which enables the opening and closing of said jaws with said outer chuck locked in a stationary position.

3. A device as in claim 2 wherein said reversible power tool and said sleeve locking device are secured together by a holding means when said sleeve locking device is not in use.

4. A device as in claim 3 wherein said reversible power tool has a circular groove on the forward end and said sleeve locking device has at least one sleeve holding spring clip with detents to snap into said circular groove to hold said sleeve locking device against said reversible power tool.

5. A device as in claim 3 wherein said switch means is a button switch.

* * * * *